UNITED STATES PATENT OFFICE.

JOHN W. KIDWELL, OF WASHINGTON, DISTRICT OF COLUMBIA.

IMPROVEMENT IN EXTRACTING GOLD AND SILVER FROM THEIR ORES.

Specification forming part of Letters Patent No. 83,582, dated October 27, 1868.

*To all whom it may concern:*

Be it known that I, JOHN W. KIDWELL, of the city of Washington, District of Columbia, have discovered a Mode of Extracting Gold and Silver from their Respective Ores; and I do hereby declare the following to be a full and exact description of the same.

Sulphurets of iron (pyrites) containing precious metals are concentrated and roasted, whence oxide of iron mixed with metallic gold and oxide of silver results. This oxide of iron I mix intimately with twenty-three per cent. of coal, charcoal, coke, plumbago, or any other carbonaceous substance, and heat the whole for six hours, at a light red heat, in Bischoff's patent oven. (See American patent, dated 25th February, 1868.)

By this operation I obtain finely-divided iron mixed with gold. After letting it cool in air-tight vessels it is taken out and amalgamated, or spread firstly in thin layers on the ground and sprinkled with a little water, in order that it may gradually oxidize again in the air. This oxide of iron containing metallic gold is submitted to an amalgamation to secure the gold.

Sulphurets or other ores which, besides gold, contain also some silver are treated in the same manner, and both of these noble metals extracted by quicksilver.

After having described my invention, I claim—

The use of finely-divided iron prepared according to Bischoff's patent process, in connection with the amalgamation of gold and silver ores, as herein described and set forth.

JOHN W. KIDWELL.

Witnesses:
   JNO. S. KIDWELL,
   W. ROTHBROCK.